July 22, 1969 D. G. MACKEY ET AL 3,457,362

"WHITE" BALANCE CONTROL FOR COLOR TELEVISION RECEIVER

Filed July 8, 1966 2 Sheets-Sheet 1

INVENTORS
DONALD G. MACKEY &
THADDEUS V. RYCHLEWSKI
BY
Robert E. Strauss
ATTORNEY INVENTORS
DONALD G. MACKEY &
THADDEUS V. RYCHLEWSKI
BY
Robert E. Strauss
ATTORNEY 3,457,362
"WHITE" BALANCE CONTROL FOR COLOR TELEVISION RECEIVER Donald G. Mackey and Thaddeus V. Rychlewski, Seneca Falls, N.Y., assignors to Sylvania Electric Products Inc., a corporation of Delaware Filed July 8, 1966, Ser. No. 563,866
Int. Cl. H04n 5/38, 5/44
U.S. Cl. 178—5.4 3 Claims

ABSTRACT OF THE DISCLOSURE

A television receiver includes means for shifting the "white" color temperature of a cathode ray tube in accordance with received monochrome and color signal. The receiver includes apparatus for shifting the ratio of drive signals applied to the cathodes of the cathode ray tube to effect "white" color temperature shift without deleterious effect upon gray-scale tracking. Means are included for both manual and automatic "white" color temperature shifting.

This invention relates to television receivers adapted to reproduce images in both monochrome and color and more particularly to apparatus for shifting the white balance or with color temperature of such receivers.

Present-day color standards used in determining the composition of color television signals provide for the transmission of a white known as "illuminant C" having a color temperature of about 6500° to 7000° K. With this signal, the "standard" color television receiver has the capability to reproduce a visual image having a "white" response at the above-mentioned color temperature.

However, the generally accepted white for monochrome receivers has a bluish cast in order to provide enhanced contrast and a color temperature in the range of about 11,000 to 12,000° K. Thus, the designer of a compatible television receiver is faced with the problem of providing a white balance or white color having two widely different color temperatures depending upon the type of transmitted signal, i.e. monochrome or color.

Although the prior art suggests several techniques for solving the white color temperature problem, it has been found that all of the known suggestions leave much to be desired. For example, the approach most evident in available color television receivers is to compromise the white balance to provide a white color having a temperature of about 9300° K. for both monochrome and color signals. Obviously, an approach results in degradation of the white color for both monochrome and color signals.

In another known approach to the color temperature problem, means are provided for shifting the white balance or white color temperature in accordance with the type of signal received. More specifically means are provided for altering the bias voltage applied to either the control grid or the screen grid of one or more electron guns of a color cathode ray tube in accordance with a received monochrome or color signal. While this technique appears to be an improvement over the above-mentioned compromise approach, it has been found that altering the voltages applied to either or both the control grid and screen grid of the electron guns in a color cathode ray tube serves to optimize the white balance or white color temperature at but one particular value of brightness level. Thus, such systems have been found lacking in uniformity of "gray scale" tracking and variations in brightness and contrast levels result in undesired non-uniformity of white balaice or white color temperature.

Therefore, it is an object of this invention to enhance the image reproduction capabilities of a television receiver adapted to utilize both monochrome and color signals.

Another object of the invention is to provide a television receiver capable of reproducing images having a color temperature compatible with both monochrome and color signal reception and independent of brightness level.

Still another object of the invention is to provide a television receiver having a white balance or white color temperature which is uniform for all variations of both brightness level and contrast.

A further object of the invention is to provide a compatible television receiver which automatically shifts the white balance or white color temperature in accordance with the reception of either a monochrome signal or a color signal without degradation in gray-scale tracking.

A still further object of the invention is to provide a compatible television receiver having uniformity of gray-scale tracking and including means available to a viewer for selecting a white balance or white color temperature in accordance with a received monochrome or color signal.

These and other objects are achieved in one aspect of the invention by a compatible television receiver adapted to reproduce both monochrome and color images wherein means are provided for shifting the white balance or white color temperature in accordance with the reception of either a monochrome or color signal. In one form of apparatus, the shift in white balance is effected by altering the ratio of signal drive voltages applied to the cathodes of the electron guns of a color cathode ray tube after adjusting each of the electron guns to operate along substantially similar characteristic drive curves. In another form of apparatus, the shift in white balance is automatically effected by utilizing a control signal developed in the chrominance channel of a color television receiver to alter the ratio of signal drive voltages applied to the electron guns of a color cathode ray tube.

For a better understanding of the present invention, together with other and further objects, advantages and capabilities thereof reference is made to the following disclosure and appended claims in connection with the accompanying drawings in which:

Figures 1, 4:
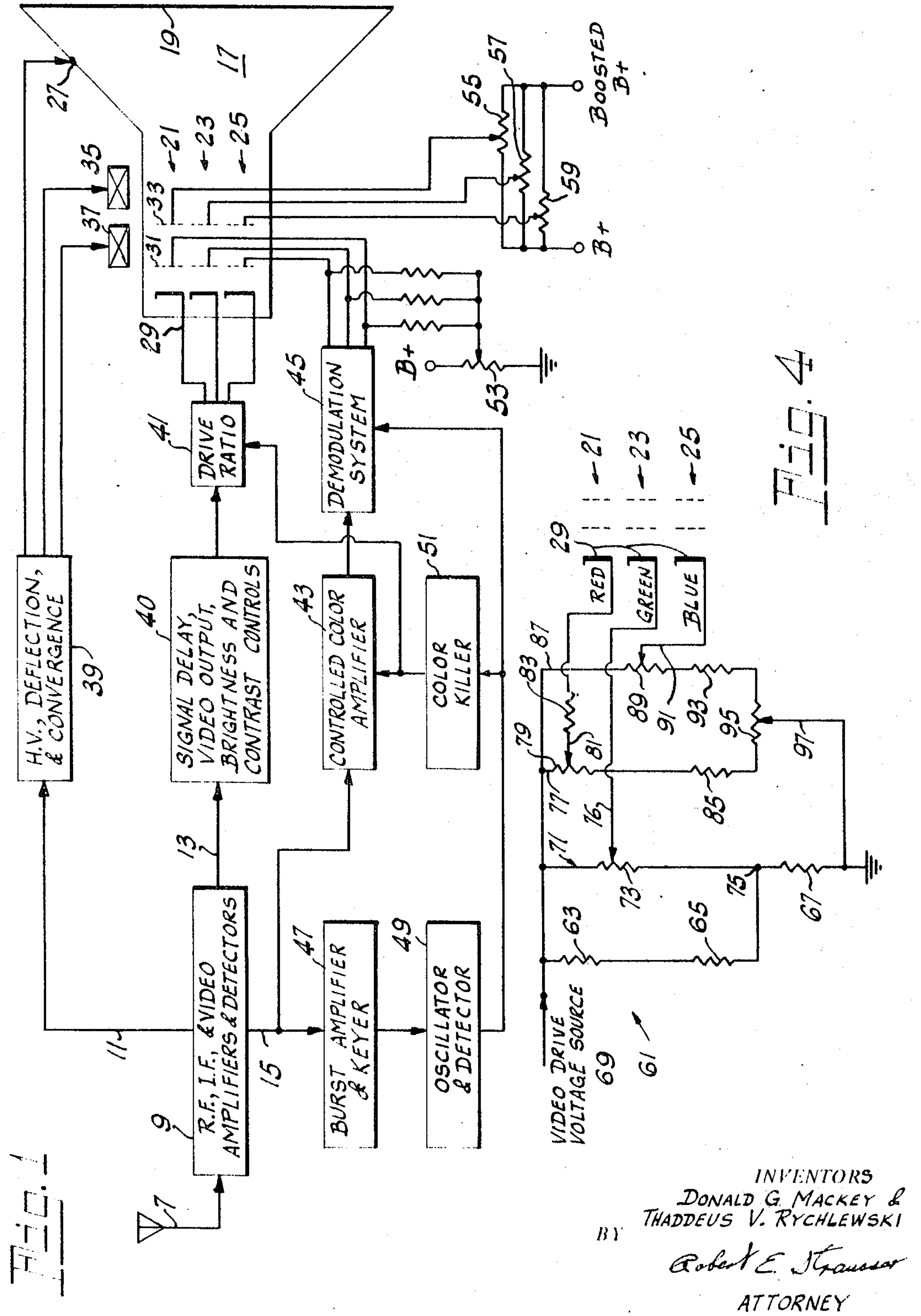
FIG. 1 is a diagram, partly schematic, illustrating a compatible television receiver.
FIG. 4 is a block and schematic diagram illustrating one embodiment of the invention.

Referring to the drawings, FIG. 1 illustrates a compatible color television receiver adapted to respond to both monochrome and color signals to reproduce images in both black and white and color. The receiver includes an antenna 7 for intercepting transmitted signals and coupling these signals to a receiver circuit, block 9, including the usual RF, IF, and video amplification and detection stages. The receiver circuit, block 9, produces a number of output signals which are applied by way of a high voltage channel 11, a luminance channel 13, and a chrominance channel 15 to a color cathode ray tube 17.

The color cathode ray tube 17 may be any one of a number of well-known image reproducers and a preferred form is a "shadow-mask" type of reproducer. The cathode ray tube 17 includes a screen 19 having triads of red, green, and blue phosphors light responsive to electron impingement and a red, green, and blue electron gun, 21, 23, and 25 respectively, for providing electron beams.

The cathode ray tube 17 includes an anode 27 and each of the electron guns 21, 23, and 25 includes a cathode 29, control grid 31, and screen grid 33. Also, deflection apparatus 35 and convergence apparatus 37 are associated with the cathode ray tube 17 and mounted on the neck portion thereof.

Referring back to the output signals available from the receiver circuit, block 9, one output is applied to the high voltage channel 11 which includes the high voltage, beam deflection, and beam convergence circuitry 39. Therein is developed a high voltage which is applied to the anode 27 of the cathode ray tube 17, horizontal and vertical deflection signals which are applied to the deflection apparatus 35 to cause the electron beams to scan the screen 19, and convergence signals which are applied to the convergence apparatus 37 and serve to converge the electron beams provided by the electron guns 21, 23, and 25 respectively.

Another output from the receiver circuit, block 9, is applied to the luminance channel 13 which includes the usual signal delay means and video amplifier output means having the usual brightness and contrast controls 40 and a signal drive voltage ratio means 41. The luminance channel 13 processes information corresponding to the brightness of an image being scanned and the voltage ratio means 41 treats this information in a manner such that a desired voltage ratio is applied to the cathode 29 of the electron guns 21, 23, and 25 as will be explained hereinafter.

Still another output from the receiver circuit, block 9, is applied to the chrominance channel 15 wherein a controlled color amplifier 43 passes to chrominance components of a composite video signal to a demodulation system 45. The composite video signal, including a color burst signal, is also applied to a series connected burst amplifier and keyer stage 47 and oscillator and detector stage 49 shunting the controlled color amplifier 43. One output signal from the oscillator and detector stage 49 is coupled to a color killer stage 51 wherein is developed a control signal for enabling or disabling the controlled color amplifier 43. This control signal may also be utilized to control the operation of the voltage ratio means 41 as will be explained hereinafter. Another output signal from the oscillator, and detector stage 49 is coupled to the demodulation system 45 wherein a synchronous demodulation process provides $R-Y$, $B-Y$, and $G-Y$ color difference signals which are individually applied to the control grid 31 of each of the electron guns 21, 23, and 25.

In a preferred form, the bias voltage applied to the control grid 31 of the electron guns 21, 23, and 25 is adjustable by way of a variable resistor 53 coupled between a voltage source B+ and a voltage reference level such as a circuit ground. Also, the bias voltage applied to the screen grid 33 of each of the electron guns 21, 23, and 25 is individually controllable by way of separate alterable impedances 55, 57, and 59 respectively connected in parallel intermediate a first voltage source B+ and a second voltage source, Boosted B+.

Figure 2:
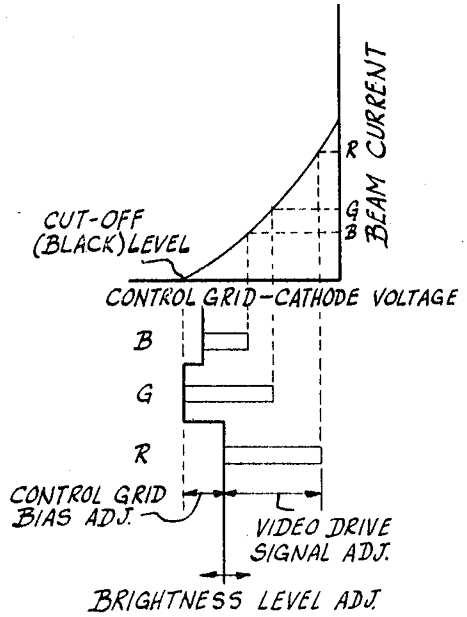
FIGS. 2 and 3 are a graphic representation illustrating features of the characteristic drive curves of color cathode ray tube guns.
Figure 3:
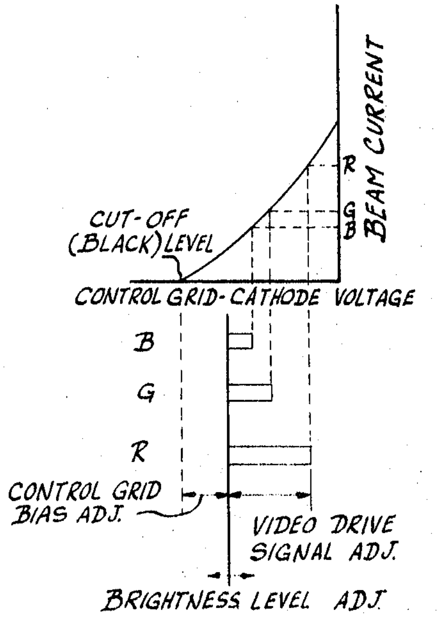

By way of explanation prior to a discussion of the preferred embodiments of the invention, FIGS. 2 and 3 will serve to graphically illustrate the maintenance of a uniform gray-scale tracking in accordance with a shift in "white" response color temperature in response to a shift in received signal. Moreover, variations in brightness and contrast control settings do not deleteriously affect the gray-scale tracking uniformity.

More explicitly, it is well known that each electron gun of a multi-gun color cathode ray tube has an individual characteristic drive curve and an individual cut-off value. Also, the slope of the characteristic drive curve is dependent upon the individual adjustments of the bias potentials applied to the screen grid electrode of each electron gun. Further, the cut-off value of the characteristic curve of each electron gun is dependent upon the individual bias potential applied to the control grid electrode thereof.

As graphically illustrated in FIG. 2, it is a common practice to set-up a "white" response color tempearture by adjusting the value of bias potential applied to the control grid of each of the electron guns. However, it can be readily understood that a system which alters the values of the bias potentials applied to the control grids of individual electron guns will obviously alter the gray-scale tracking. Also, a shift in the brightness level adjustment will cause a shift in the ratio of beam current available from each electron gun and an undesired shift in "white" response color temperature deleterious to uniform gray-scale tracking.

For example, assuming one were to adjust the brightness level of FIG. 2, it can be seen that as the level is moved in the direction of the electron beam cut-off value the electron beam available from the green electron gun would be the first to reach the cut-off value. Thereafter, the blue and red electron guns would reach the cut-off value. Thus, adjustament of the brightness level deleteriously affects the gray-scale tracking.

To overcome this undesirable condition, all of the electron guns are set up to cut off at substantially the same point on the characterisic drive curve as illustrated in FIG. 3. Therein, a subsantially identical value of bias potential is applied to the control grid of each electron gun while the drive signals are adjusted to provide the desired ratio of potentials applied to the electron guns. Further, the bias potential applied to the screen grid electrode of each electron gun is adjusted to provide a substantially identical characteristic drive curve for each electron gun.

Under these conditions, it can be readily understood tht uniform gray-scale tracking is achieved regardless of variations in the adjustment of the brightness level. Moreover, it is obvious that a system which alters the bias potentials applied to either the control grid electrode or screen grid electrode of one electron gun with respect to another will cause a deviation in the charatceristic drive curve thereof and non-uniform gray-scale tracking.

Referring to FIG. 4, one specific embodiment of the signal drive ratio means 41 of FIG. 1 includes a circuit network having a fixed load impedance 61 including resistor 63, resistor 65, and resistor 67 series connected intermediate a signal drive voltage source 69 and a voltage reference level such as circuit ground. A first voltage divider 71 having an alterable resistor 73 is connected in parallel with resistors 63 and 65 and coupled intermediate the drive voltage source 69 and a junction 75 of resistor 65 and resistor 67. An adjustable tap 76 of the alterable resistor 73 is connected to the cathode 29 of the green electron gun 23.

A second voltage divider 77 includes an alterable resistor 79, having an adjustable tap 81 connected to the cathode 29 of the red electron gun 21 by way of a current limiting resistor 83, and a fixed resistor 85 connected in series with the alterable resistor 79. A third voltage divider 87 includes an alterable resistor 89, having an adjustable tap 91 connected to the cathode 29 of the blue electron gun 25, and a fixed resistor 93 connected in series with the alterable resistor 89.

The second and third voltage dividers 77 and 87 respectively are coupled in parallel intermediate the drive voltage source 69 and opposite ends of a differentially connected alterable resistor 95. The differentially connected alterable resistor 95 has an adjustable tap 97 connected to the voltage reference level or circuit ground.

In the operation of the above-described signal drive ratio means 41, the alterable resistors 73, 79, and 89 respectively are adjusted to provide a signal drive voltage ratio which is applied to the cathodes 29 of the green, red, and blue electron guns 23, 21, and 25. Since the electron guns 21, 23, and 25 have been adjusted in a manner previously described to have a substantially identical characteristic drive curve, the application of the signal drive voltage ratio to the cathodes 29 thereof causes development of a specific white balance or white color temperature.

When it is desired to shift the white balance or white color temperature, the adjustable tap 97 of the differentially coupled alterable resistor 95 is varied. Thereupon, the ratio of the signal drive voltages applied to the cathodes 29 of the electron guns 21 and 25 is shifted which, in turn, shifts the white balance and white color temperature without material effect upon the gray-scale tracking.

Figure 5:
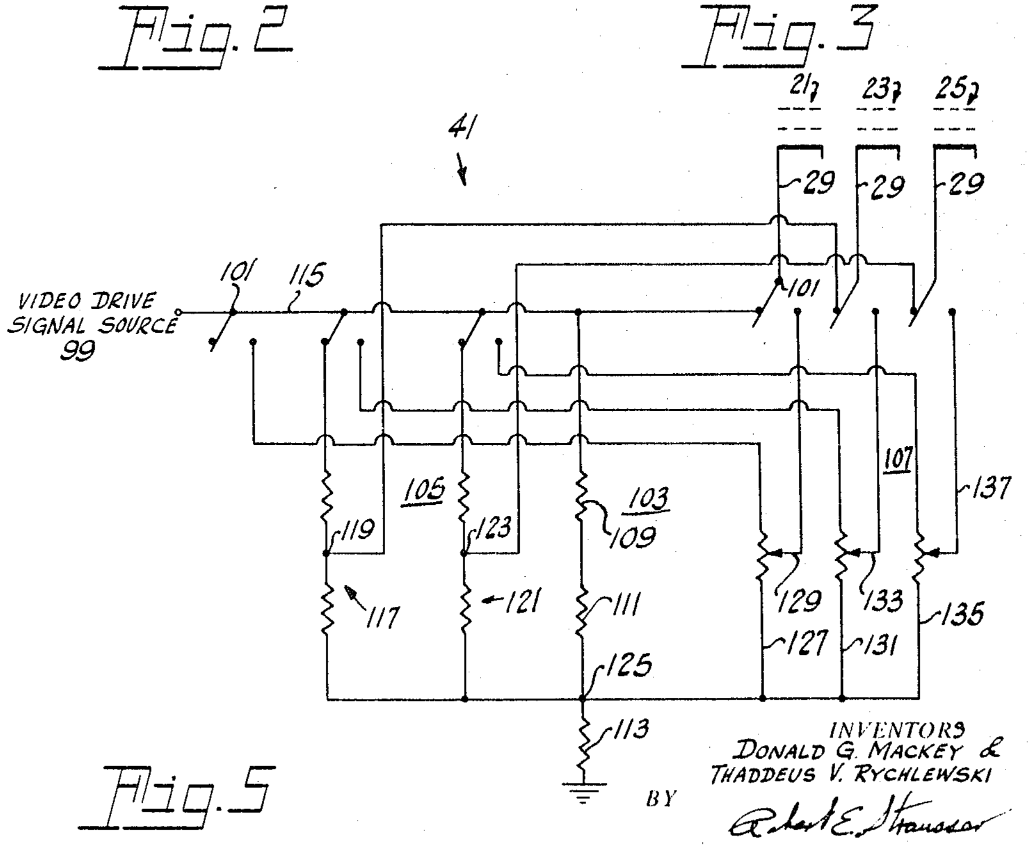
FIG. 5 is a block and schematic diagram illustrating another embodiment of the invention.

FIG. 5 illustrates another embodiment of the signal drive voltage ratio means 41 coupled intermediate a signal drive voltage source 99 and the cathodes 29 of each of the electron guns 21, 23, and 25. In this embodiment, an alterable switching means 101 having a first and second operational location is utilized to shift the white balance or white color temperature of the color cathode ray tube 17.

More specifically, the signal drive ratio means 41 of FIG. 5 includes a fixed load impedance 103, a first circuit network 105, and a second circuit network 107. The fixed load impedance 103 is common to both the first and second networks 105 and 107 and includes resistor 109, resistor 111, and resistor 113 series connected between the drive voltage source 99 and a voltage reference level such as circuit ground.

The first circuit network 105 includes a DC connection 115, a first voltage divider 117 having a tap 119, and a second voltage divider 121 having a tap 123. The DC connection 115 couples the signal drive voltage source 99 via the switching means 101 to the cathode 29 of the red gun 21. The first voltage divider 117 is connected via the switching means 101 intermediate to the drive voltage source 99 and a junction 125 of resistor 111 and 113 with the tap 119 thereof coupled via the switching means 101 to the cathode 29 of the green gun 23. The second voltage divider 121 is connected via the switching means 101 intermediate to the drive voltage source 99 and the junction 125 with the tap 123 thereof coupled via the switching means 101 to the cathode 29 of the blue gun 25.

The second circuit network 107 includes a first voltage divider 127 having an alterable tap 129, a second voltage divider 131 having an alterable tap 133, and a third voltage divider 135 having an alterable tap 137. Each of the voltage dividers 127, 131, and 135 is connected via the switching means 101 to the drive voltage source 99 and to the junction 125. Also, the taps 129, 133, and 137 are connected via the switching means 101 to the cathode 29 of the red, green, and blue guns 21, 23, and 25 respectively. As mentioned above, the switching means 101 is of the dual position type having a first and second operational location. The first locational position of the switching means 101 may be utilized to couple the drive voltage source 99 to the cathodes 29 of the electron guns 21, 23, and 25 via the first circuit network 105. Thus, the first circuit network 105 serves to provide a first ratio of signal drive voltages which is applied to the cathodes 29 of the electron guns 21, 23, and 25 and serves to cause development of a first white balance or white having a first color temperature.

In order to shift the white balance or white color temperature, the switching means 101 is activated by a control signal developed in the color killer stage 51, for example, causing movement from the first to the second locational position whereupon the first circuit network 105 is disabled and the second circuit network 107 is enabled. Thereupon, the second circuit network 107 serves to provide a second ratio of signal drive voltages which is applied to the cathodes 29 of the electron guns 21, 23, and 25. The applied second ratio of signal drive voltages serves to cause the development of a second white balance or a white having a second color temperature.

Additionally, it should be noted that the above-described shift in operational conditions and white color temperature may be effected manually or automatically. For example, the alterable switch means 101 may include a relay type switch coupled to the control signal developed in the color killer stage 51 as mentioned with respect to FIG. 1. Alternatively, the adjustable arm 97 of the alterable resistor 95, illustrated in the embodiment of FIG. 4, may be of a type having a shaft extending exteriorly of the television receiver and available to a viewer permitting a continuous shift in color balance in accordance with the desires of the viewer. Obviously, a step-type resistance switch substituted for the alterable resistor 95 is equally applicable and appropriate.

Therefore, the control signal developed in the color killer stage 51, which varies in accordance with a color or monochrome signal to cause enablement or disablement of the controlled color amplifier 43, may be utilized to automatically shift the alterable switch 101 from a first to a second operational condition and, consequently, shift the ratio of potential applied to the image reproducer and the "white" color temperature response thereof. Alternatively, the shifting may be accomplished manually as discussed previously.

Thus, there has been provided a compatible television receiver having enhanced capabilities for image reproduction of both monochrome and color television signals. The receiver includes apparatus for shifting the white balance or white color temperature without deleterious effect upon gray scale tracking capability for all values of brightness and contrast adjustment. Further, the apparatus is adapted to manual operation wherein the viewer has control over the amount of color temperature shift as well as automatic operation wherein the color temperature shift is effected by the type of signal received without inconvenience to the viewer. Moreover, the apparatus provides an improved image reproduction capability with a minimal increase in cost and circuit complexity.

While there have been shown and described what are at present considered the preferred embodiments of the invention, it will be obvious to those skilled in the art that various changes and modifications may be made therein without departing from the invention as defined by the appended claims.

What is claimed is:

1. In a color television receiver for processing monochrome and color signals to provide a visual image display, apparatus for shifting the "white" response color temperature in accordance with a shift in processed signals comprising in combination:

visual image display means including a color cathode ray tube having three electron guns with each gun having a cathode, control grid and screen grid;

receiver means for processing both monochrome and color signals to provide signal drive potentials;

signal drive ratio means coupling said signal drive potentials to said cathodes of said color cathode ray tube, said means including first, second and third voltage dividers coupled in parallel to said signal drive potentials with each of said dividers having an adjustable arm coupled to the cathode of one of said three electron guns of said color cathode ray tube;

"white" response color temperature shifting means including an adjustable impedance having an alterable arm, said impedance interconnecting two of said voltage dividers with said alterable arm coupled to a potential reference level whereby positional alteration of said alterable arm of said adjustable impedance effects a shift in "white" response color temperature of said image display without material affect upon gray-scale tracking of said television receiver.

2. The combination of claim 1 wherein control of said alterable arm of said adjustable impedance is available to a viewer of a television receiver.

3. In a color television receiver for processing monochrome and color signals to provide a visual image display, apparatus for shifting the "white" response color temperature in accordance with a shift in processed signals comprising in combination:

a color cathode ray tube having three control guns with each gun having a cathode, control grid and screen grid; receiver means for processing both monochrome and color signals to provide signal drive potentials; and signal drive ratio means coupling said signal drive potentials to said cathodes of said color cathode ray tube, wherein said signal drive ratio means includes switching means, a fixed load impedance, and a first and second circuit network, said switching means having a first positional location coupling said fixed load impedance and said first circuit network to said cathodes of said cathode ray tube and a second positional location coupling said second circuit network to said cathodes whereby altering said positional location of said switching means alters the ratio of signal drive potentials applied to said cathodes and the "white" response color temperature of said display means.

References Cited

UNITED STATES PATENTS

| | | | |
|---|---|---|---|
| 3,032,608 | 5/1962 | Gleichauf | 178—5.4 |
| 3,114,796 | 12/1963 | Stark | 178—5.4 |
| 3,301,945 | 1/1967 | Dietch | 178—5.4 |
| 3,324,236 | 6/1967 | Dietch et al. | 178—5.4 |

RICHARD MURRAY, Primary Examiner

JOHN MARTIN, Assistant Examiner